United States Patent
Yu et al.

(10) Patent No.: US 12,367,050 B2
(45) Date of Patent: *Jul. 22, 2025

(54) SYSTEMS AND METHODS FOR RUNNING APPLICATIONS ASSOCIATED WITH BROWSER-BASED USER INTERFACES WITHIN MULTI-DEVELOPER COMPUTING PLATFORMS

(71) Applicant: Palantir Technologies Inc., Denver, CO (US)

(72) Inventors: Stephanie Yu, New York, NY (US); Walker Burgin, Seattle, WA (US); Alexander Ryan, Palo Alto, CA (US); Miklos Danka, Prague (CZ)

(73) Assignee: Palantir Technologies Inc., Denver, CO (US)

( * ) Notice: Subject to any disclaimer, the term of this patent is extended or adjusted under 35 U.S.C. 154(b) by 621 days.

This patent is subject to a terminal disclaimer.

(21) Appl. No.: 17/685,001

(22) Filed: Mar. 2, 2022

(65) Prior Publication Data
US 2022/0188126 A1 Jun. 16, 2022

Related U.S. Application Data

(63) Continuation of application No. 16/931,663, filed on Jul. 17, 2020, now Pat. No. 11,294,694.

(Continued)

(51) Int. Cl.
*G06F 9/445* (2018.01)
*G06F 8/40* (2018.01)
(Continued)

(52) U.S. Cl.
CPC ............ *G06F 9/44521* (2013.01); *G06F 8/54* (2013.01); *G06F 9/451* (2018.02); *G06F 8/40* (2013.01)

(58) Field of Classification Search
CPC ........ G06F 9/44521; G06F 9/451; G06F 8/54; G06F 8/40
See application file for complete search history.

(56) References Cited

U.S. PATENT DOCUMENTS

| | | | |
|---|---|---|---|
| 5,835,749 A | 11/1998 | Cobb | |
| 6,185,734 B1* | 2/2001 | Saboff | G06F 9/44521 |
| | | | 707/999.203 |

(Continued)

FOREIGN PATENT DOCUMENTS

EP 3770755 A2 1/2021

OTHER PUBLICATIONS

Anonymous: "Library (computing)—Wikipedia", Jul. 21, 2019 (Jul. 21, 2019), pp. 1-10, retrieved from the Internet: URL:https://web.archive.org/web/20190721205253/https://en.wikipedia.org/wiki/Library_(computing); retrieved Nov. 25, 2022.

(Continued)

*Primary Examiner* — Kevin L Young
*Assistant Examiner* — Kimberly L Jordan
(74) *Attorney, Agent, or Firm* — Faegre Drinker Biddle & Reath LLP

(57) ABSTRACT

Systems and methods for developing one or more applications associated with a browser-based user interface within a multi-developer computing platform employ one or more processors that receive a request to build one or more applications configured to run in a browser-based user interface on a client; determine whether the one or more applications are associated with a core library and one or more runtime libraries; and in response to determining that the one or more applications are associated with the core library and the one or more runtime libraries: determine one or more version numbers associated with the one or more runtime libraries; and in response to the determined one or (Continued)

more version numbers being within a predetermined range associated with the core library, dynamically link the one or more runtime libraries and the one or more applications.

20 Claims, 9 Drawing Sheets

Related U.S. Application Data

(60) Provisional application No. 62/877,519, filed on Jul. 23, 2019.

(51) Int. Cl.
*G06F 8/54* (2018.01)
*G06F 9/451* (2018.01)

(56) References Cited

U.S. PATENT DOCUMENTS

| | | | | |
|---|---|---|---|---|
| 8,856,724 | B2* | 10/2014 | Somani | G06F 9/44 |
| | | | | 717/126 |
| 9,519,468 | B2* | 12/2016 | Goetz | G06F 9/44536 |
| 10,564,959 | B2* | 2/2020 | Kennedy | G06F 8/61 |
| 11,294,694 | B2 | 4/2022 | Yu et al. | |
| 2007/0180441 | A1 | 8/2007 | Ding et al. | |
| 2010/0037208 | A1 | 2/2010 | Gray et al. | |
| 2010/0106950 | A1 | 4/2010 | Hou et al. | |
| 2012/0084064 | A1 | 4/2012 | Dzenis et al. | |
| 2012/0324417 | A1 | 12/2012 | Somani et al. | |
| 2013/0031564 | A1 | 1/2013 | Howe et al. | |
| 2016/0239279 | A1 | 8/2016 | Goetz et al. | |
| 2018/0267796 | A1 | 9/2018 | Kennedy et al. | |
| 2021/0026656 | A1 | 1/2021 | Yu et al. | |

OTHER PUBLICATIONS

Anonymous: "Standard library—Wikipedia", Jul. 10, 2019, pp. 1-3, retrieved from the Internet: URL:https://web.archive.org/web/20190710194513/https://en.wikipedia.org/wiki/Standard_library; retrieved Nov. 25, 2022.

Anonymous; Facade pattern; Wikipedia; Apr. 15, 2010.

Gradle User Manual; Version 5.5.1; https://docs.gradle.org/5.5.1/userguide/userguide.pdf; released Jul. 10, 2019; 1151 pages (Year: 2019).

Gradle Release Dates; https://gradle.org/releases/ (Year: 2021).

H.C. Vazquez, A. Bergel, S. Vidal, J.A. Diaz Pace, C. Marcos; Slimming JavaScript Applications: an Approach for Removing Unused Functions from JavaScript Libraries; Oct. 18, 2018; 34 pages (Year: 2018).

Gradle et al.; Gradle User Manual Version 5.6.2; from https://docs.gradle.org/current/userguide/userguide.pdf; pp. 5-9; 123-125; 485-749; Jan. 1, 2018.

* cited by examiner

SYSTEMS AND METHODS FOR RUNNING APPLICATIONS ASSOCIATED WITH BROWSER-BASED USER INTERFACES WITHIN MULTI-DEVELOPER COMPUTING PLATFORMS

CROSS REFERENCE TO RELATED APPLICATIONS

This application is a continuation of U.S. application Ser. No. 16/931,663, filed Jul. 17, 2020, which claims priority to U.S. Provisional Application No. 62/877,519, filed Jul. 23, 2019, incorporated by reference herein for all purposes.

BACKGROUND

Certain embodiments of the present invention are directed to multi-developer computing platforms. More particularly, some embodiments of the present invention provide systems and methods for running applications associated with browser-based user interfaces within multi-developer computing platforms.

Computing platforms such as those for integrating, managing and interacting with data from different sources and formats provide a runtime environment for browser-based user interfaces for remote client devices. A workspace server in the computing platform provides a runtime environment (also referred to as a workspace) for the one or more applications that are provided to the client device through a browser-based user interface. Some computing platforms may provide access to multiple applications during runtime through a single inline frame (iframe). However, the various applications may dynamically link to differing versions of the same linked libraries, plugins, and/or other assets which leads to inconsistencies at runtime for applications running within the single iframe. As such, developing applications by multiple developers for a single-threaded browser-based user interface can be difficult when the developers author differing applications that use differing versions of the same libraries. One potential solution includes statically linking each library on a per-application basis but such a solution results in large size applications that degrade the performance of running and rendering these applications within the web page of the browser. In addition, upgrading of the runtime environment and upgrading libraries can result in further inconsistencies when running the applications. Hence the computing platform can suffer from an increase in development costs, operating inefficiencies including larger storage requirements and the use of additional computing resources.

Hence it is highly desirable to improve techniques for running an application associated with a browser-based user interface within a multi-developer computing platform.

SUMMARY

Certain embodiments of the present disclosure are directed to computing platforms that provide workspace runtime environments for remote client devices. In certain embodiments a computer platform provides a workspace runtime environment for one or more client devices and employs a core library during runtime that serves as a type of direct access and control mechanism for versions of runtime libraries for applications that are being provided in the runtime environment. Some embodiments employ a core library that exposes different versions of libraries to the applications through an API layer. The libraries are managed by the core library by restricting access to libraries within a predetermined version range. Frequently used functions (e.g., common functions such as formatDate, HttpBridge, getTimeZone, and getUser) are implemented directly into the core library to improve consistency and performance of calls to such functions. In some embodiments, certain versions of libraries are bundled together in particular versions of the core library.

In certain embodiments, upgrading between versions of a library includes employing two core libraries with each core library being associated with a different version of the library. Access to each version is logged. The core library corresponding to older versions of libraries is retired if no further calls to any of its library is being logged for a predetermined time period.

According to some embodiments, a method for developing one or more applications associated with a browser-based user interface within a multi-developer computing platform includes receiving a request to build one or more applications configured to run in a browser-based user interface on a client, determining whether the one or more applications are associated with a core library and one or more runtime libraries, and in response to determining that the one or more applications are associated with the core library and the one or more runtime libraries, determining one or more version numbers associated with the one or more runtime libraries, and in response to the determined one or more version numbers being within a predetermined range associated with the core library, dynamically linking the one or more runtime libraries and the one or more applications, wherein the method is performed using one or more processors.

According to certain embodiments, a system for developing one or more applications associated with a browser-based user interface within a multi-developer computing platform includes one or more processors configured to receive a request to build one or more applications configured to run in a browser-based user interface on a client, determine whether the one or more applications are associated with a core library and one or more runtime libraries, and in response to determining that the one or more applications are associated with the core library and the one or more runtime libraries, determine one or more version numbers associated with the one or more runtime libraries, and in response to the determined one or more version numbers being within a predetermined range associated with the core library, dynamically link the one or more runtime libraries and the one or more applications.

According to some embodiments, a system for upgrading applications associated with a browser-based user interface within a multi-developer computing platform including one or more clients including a browser-based user interface, one or more processors of a computing platform configured to interface with a first core library and a second core library, each of the first core library and the second core library being associated with different versions of one or more runtime libraries and configured to provide applications with access to the different versions of the one or more runtime libraries through the browser-based user interface, determine the versions of the one or more runtime libraries being accessed through a log file generated by the first core library and the second core library, and in response to determining that no versions of the one or more runtime libraries of the first core library is being accessed for a predetermined time period, terminate the first core library.

Depending upon the embodiment, one or more benefits may be achieved. These benefits and various additional benefits can be fully appreciated with reference to the detailed description and accompanying drawings that follow.

BRIEF DESCRIPTION OF THE DRAWINGS

The implementations will be more readily understood in view of the following description when accompanied by the below figures, wherein like reference numerals represent like elements, and wherein.

DETAILED DESCRIPTION

Figure 1:
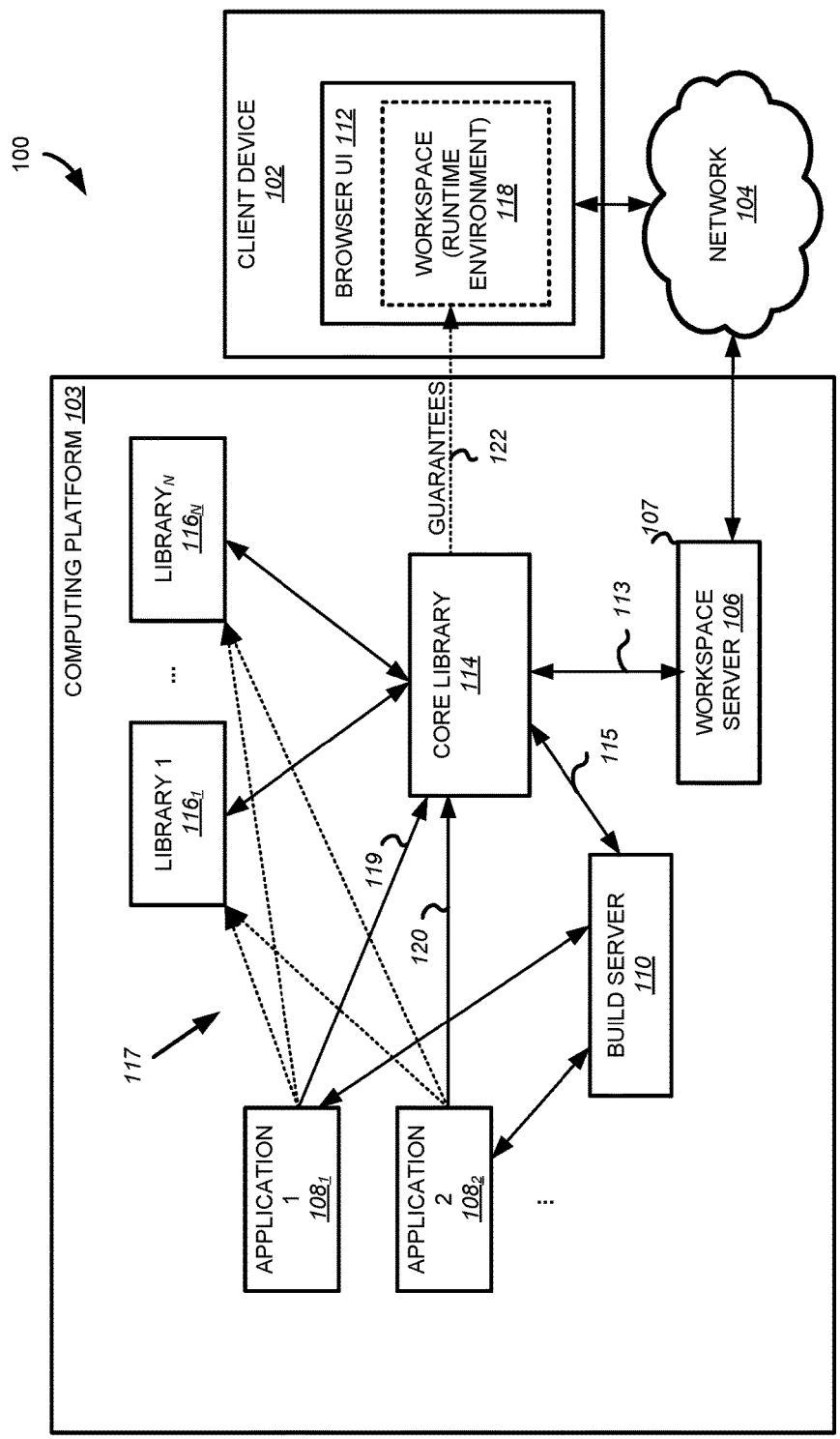
FIG. 1 is an example of a system for running an application associated with a browser-based user interface in accordance with one example set forth in the disclosure.

Reference will now be made in detail to specific example embodiments for carrying out the disclosed subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Aspects of the subject technology are directed to methods and systems for running an application associated with a browser-based user interface within a multi-developer computing platform. In certain embodiments, a core library, implemented in one example as an application interface (API) is employed in the computing platform so that applications interface with the core library instead of interacting with the runtime environment directly via window APIs. Each asset, such as an application, plugin, or other asset is built against a single, versioned set of workspace APIs and provides a clear and linear upgrade path both for the runtime and for the assets. In certain examples, runtime library dependencies are externalized that are present on every page provided through the browser-based user interface. As such, each application, for example, does not bring in a separate copy of certain core libraries and instead a runtime environment provides a single copy to be shared by all applications. In some examples, the core library includes one or more common functions such as Java Script functions that are commonly used among multiple applications. For example, the core library allows at least one of the applications of the plurality of applications to interact with workspace runtime application interfaces (APIs) by importing the workspace runtime APIs from a versioned package as if they were another front-end library.

In some embodiments, at compile time, the core library is used to determine one or more version numbers that are associated with one or more runtime library applications and determines if the version numbers are within a predetermined range associated with the core library. Access is then provided to the one or more libraries through the browser-based user interface if the version numbers are within the predetermined range as determined through the core library at compile time. In some implementations the computer platform provides one or more of the plurality of applications in a single frame for a web browser-based user interface. In certain implementations the browser-based user interface is configured to use the core library during runtime. At compile time the system verifies that dynamically linked runtime libraries are consistent with versions of the application. In certain implementations, the asset is not able to published to be viewed in the browser if the version range is not valid.

In some embodiments, benefits include significant improvements, including for example, increased efficiency in providing runtime environments, reduced complexity in managing version changes for applications and libraries, improved upgrading of applications and libraries as well as reducing development costs of applications across a multi-developer platform. In certain examples, a core library, such as in the form of a managed API, is called by applications and manages access to a set of libraries that in some examples are the same libraries but differing versions. In some examples, the core library includes common functions such as functions that are heavily used by different applications. The commonly used functions are implemented at runtime through access of the core library.

In certain embodiments, one or more solutions rooted in computer technology overcome one or more problems specifically arising in the realm of computer technology. Some embodiments are directed to computing platforms that include workspace servers that provide access to applications to client devices through a browser-based user interface. Some embodiments are directed to computing platforms including hosts and networking devices. In some examples, the computing platforms include virtual servers or virtual machines. In certain examples, the computing platforms include a virtual computing environment that provides an operating system and/or an application server for running one or more containers. For example, a container includes a containerized application. In some examples, one or more containers run on a server or host machine of the computing platform and are associated with particular resources that include CPU, memory, storage, and/or networking capacity.

FIG. 1 illustrates a system 100 for running an application associated with a browser-based user interface within a multi-developer computing platform 103 that includes a client device 102 that communicates with computing platform 103 through network 104. This diagram is merely an example, which should not unduly limit the scope of the claims. One of ordinary skill in the art would recognize many variations, alternatives, and modifications. The client device 102 presents a browser-based user interface 112, the contents of which are provided by the computing platform 103. The computing platform 103 includes a workspace server 106, plurality of applications $108_1$, $108_2$, a plurality of libraries illustrated as library $116_1$ and library $116_n$. The libraries $116_1$-$116_n$ are linked to the differing applications through a core library 114. The dashed arrows 117 are meant to illustrate that the browser-based user interface 112 presents each of the applications $108_1$ and $108_2$ as selected by a user along with their associated libraries from which they depend. As such, the dashed lines illustrate ultimate dependencies by each of the applications on the differing libraries, but the applications do not call the libraries directly. Instead the applications call the core library 114 (such as an API) as illustrated by communication lines 119 and 120. In some examples, the computing platform 103 includes a build server 110 that is provided to developers to build the applications $108_1$ and $108_2$.

In certain implementations, the system 100 utilizes the computing platform 103 for integrating, managing and interacting with data from different sources and formats. However, any suitable system may be employed. Each of the client device 102, the workspace server 106, or the build server 110 may be implemented using the machine discussed in conjunction with FIG. 7 or multiple such machines operating in concert. The client device 102 may be a desktop computer, a laptop computer, a mobile phone, a tablet computer, a personal digital assistance, a smart watch, a smart television, a vehicle computer, and the like.

The client device 102 presents the browser-based user interface 112 which in this example employs a single iframe configuration for multiple applications $108_1$ and $108_2$. However, any suitable framing structure may be employed. The browser-based user interface 112 provides a workspace runtime environment 118 for the client device.

The applications $108_1$ and $108_2$ include processes that communicate with one another over a network in order to fulfill a goal. Example applications include managing metadata, registered resources, authentication, and other suitable processes. The applications may correspond to different applications at different uniform resource locators (URLs).

In some implementations, the workspace server 106 brokers communications 107 between a client device 102, such as queries sent through a browser-based user interface112 that is loaded from the workspace server, the workspace server106 provides a runtime environment through the browser-based user interface for application operation. It will be recognized that queries can be sent to any suitable backend service however and the workspace server can discover those services and provide the workspace runtime environment (e.g., the browser-based user interface) about those services. The workspace server 106 allows the browser-based user interface 112 to seamlessly transition between accessing various applications. The workspace server 106 receives, from the client device 102, through the browser-based UI 112, requests to access an application and provides runtime access to the application(s) $108_1$-$108_n$ as indicated by arrow 113. The workspace server 106 provides the requested application(s) and navigational GUI elements for rendering at the client device 102. As such, the workspace server 106 provides executable code to the client device for the browser-based user interface 112.

The client device 102 includes the browser-based user interface as provided through the workspace server 106. The browser-based user interface 112 receives a request from a user of the device to run an application 108 in the browser-based user interface 112. The application 108 being associated with (e.g., represented by link 119) the core library 114 through any suitable binding mechanism that binds the application 108 to the core library 114 so that the core library 114 is used by the application 108 during runtime as the mechanism through which other dependent libraries 116 are called. In one example, the core library 114 is implemented as a node package manager (NPM) package. In some examples, at compile time, the build server or other suitable component of the computing platform determines whether the application 108 is associated with one or more runtime libraries 116 and in response to determining that the application 108 is associated with the one or more runtime libraries 116, determines one or more version numbers associated with the one or more runtime libraries and, as an example, in response to the determined one or more version numbers being within a predetermined range associated with the core library 114, provides access to the one or more runtime libraries 116 through the browser-based user interface 112. In some examples, determining valid ranges is done at build time so the decision is made before the browser attempts to consume the application/library resources. The dashed line 122 illustrates that the core library 114 guarantees through workspace server 106 a workspace runtime environment 118 through browser-based user interface 112, the dependencies designated by dashed lines 117 for the various applications 108 to the libraries 116.

In one example, an application server in the computing platform stores a plurality of applications that are to be provided in the browser-based user interface, the plurality of applications 108 being associated with the core library. As further set forth below, the workspace server 106 provides bowser-based user interface code, that when executed, causes the browser-based user interface 112 to: determine whether an application selected for use in the browser-based user interface is associated with one or more runtime libraries; and in response to determining that the application is associated with the one or more runtime libraries: determines one or more version numbers associated with the one or more runtime libraries; and in response to the determined one or more version numbers being within a predetermined range associated with the core library, provides access to the one or more runtime libraries through the browser-based user interface.

By way of example, when the application is built by developers using the build server 110 (which includes the necessary build infrastructure), the core library 114 is added as a dependency for the application 108 to link the core library with the application for runtime libraries as illustrated by arrow 115. In certain examples, any versions of common function dependencies needed by the application are chosen to be within a version range guaranteed by the core library 114. Runtime library dependencies (e.g., their allowed version number range) in some examples are declared as part of the configuration of the application. Dependencies that are intended to be externalized by the core library 114 are guaranteed to be within the range of versions managed by the core library as further described below. In some implementations, the core libraries, commonly used runtime libraries that are in the core library, applications that are linked to the core libraries, runtime libraries provided by the core library and other assets are upgraded by the build server 110 or other suitable entity. In some examples, the build server performs the necessary upgrade operations (and removing operations if desired) as set forth below and also shown by arrow 115.

In certain examples, the workspace server 106 or any other suitable component of the computing platform tracks how many times runtime libraries are used by the one or more applications so that those versions that are not used often can be removed and/or those that are used often are considered for addition as a common function integrated as part of the core library. In other examples, a number of runtime functions implemented by an API or applications are tracked. In some examples, the number of times common functions are called are also logged so that those that are not being used as much as desired can be removed from the core library. For example, in response to the determined one or more version numbers being within the predetermined range associated with the core library, a process logs version numbers of the accessed one or more runtime libraries in a data store, such as any suitable memory. In some examples, system is configured to send information to the application corresponding to the one or more runtime libraries not being accessible through the browser-based user interface, in response to the determined one or more version numbers being outside the predetermined range associated with the core library, so that the application is aware the that the desired runtime library is not supported by the core library. In certain examples, the system is configured to log the determined version number associated with the one or more common functions in the data store. In other implementations, the system discovers configuration metadata provided by each application, which dictates the expected version range, and the system logs that to determine what ranges are in use.

In some examples, the core library 114 includes, such as providing access to, one or more common functions that are frequently used functions (e.g., common functions such as formatDate, HttpBridge, getTimeZone, and getUser). These common functions are implemented as runtime libraries that are bundled in the runtime environment and the application declares the SLS dependency by way the core library to guarantee the correct version is used to improve consistency and performance of calls to such functions. Also, in some embodiments, certain versions of runtime libraries 116 are guaranteed in particular versions of the core library 114. The system is configured to determine whether the application is associated with (e.g., has dependencies for) the one or more common functions that are in the core library based on version number matching. Applications have declared SLS dependencies and the system determines whether the application can upgrade to an expected version of workspace-chrome for example, based a correctly declared version range. In some implementations, the system (runtime environment), in response to determining that the application is associated with the one or more common functions, determines a version number associated with the one or more common functions associated with the application and provides access to a version of the one or more common functions corresponding the determined version number through the browser-based user interface as allowed by the core library 114.

The core library 114 in one example is an NPM package that formalizes asset dependencies in the runtime page environment and does this by, for example, safely externalizing libraries and ensuring that the libraries are provided by the page at runtime. Assets such as applications, will then be able to load less code. The core library 114 allows assets to interact with the workspace runtime APIs by importing them from a versioned package as if they were another front-end library. In some examples, a single version of the workspace (browser UI) can implement multiple concurrent versions of the core library. As such, developers can be provided with a faster and smoother upgrade path for changing runtime APIs. For example, the core library acts as an API boundary between assets and the runtime environment (e.g., browser-based user interface). This boundary enables an improved upgrade process for new versions of the core library. For main platform dependencies, the core library guarantees that versions within a certain range will be provided at runtime. If an application needs a version of a library that is higher than what can be guaranteed by the core library, the build server 110 will raise an error at build time.

In some embodiments, the computing platform 103 includes a cluster computing platform including one or more server or host machines. In some examples, the computing platform 103 includes a distributed computing platform that allows the one or more device clients 106 to distribute applications and/or data over the network 104 to a cluster of servers or host machines. In certain examples, the computing platform 103 includes a cloud computing platform that allows the one or more device clients 106 access to remote servers, data storages, networks, devices, applications and/or data resources over the network 104. For example, multiple users through the one or more client devices 106 store data at the data storages of the cloud computing platform. In other examples, the computing platform 103 is associated with a platform provider that provides the platform to multiple customers. For example, customers of the computing platform 103 include individuals, organizations and/or commercial companies.

In certain embodiments, the one or more servers or host machines are divided into in one or more regions. For example, a region represents a geographic area that the one or more servers or host machines are located within. As an example, each region relates to a different geographic area. In other examples, each region of the one or more servers or host machines includes one or more separate zones. For example, each server or host machine within a region is associated with only one zone of the one or more separate zones associated with the region. As an example, each zone within a region are isolated from any other zone within the region. In one example, each zone within a region is connected with any other zone within the region through low-latency links. In some examples, the computing platform 103 is configured to not replicate applications and/or resources across different regions. For example, each region is completely independent from any other region of the computing platform 103.

According to some embodiments, the computing platform 103 includes a container-orchestration platform. In some examples, the container-orchestration platform allows for automated deployment, scaling and/or operations of containers across the platform. For example, the container-orchestration platform employs the containers across one or more instances of the computing platform 103.

According to certain embodiments, a container of the computing platform 103 includes one or more applications. In some examples, the container also includes data and libraries associated with the one or more applications. For example, the container allows the one and more applications and their associated data and libraries to be co-located on the same server or host machine. In one example, the container allows the one and more applications and their associated data and libraries to share resources. For example, the shared resources include CPU, memory, storage, and/or networking capacity. As an example, the container represents the lowest level of a micro-service of the computing platform 103. In one example, the micro-service includes the one or more applications, libraries and the applications' dependencies.

Figure 2:
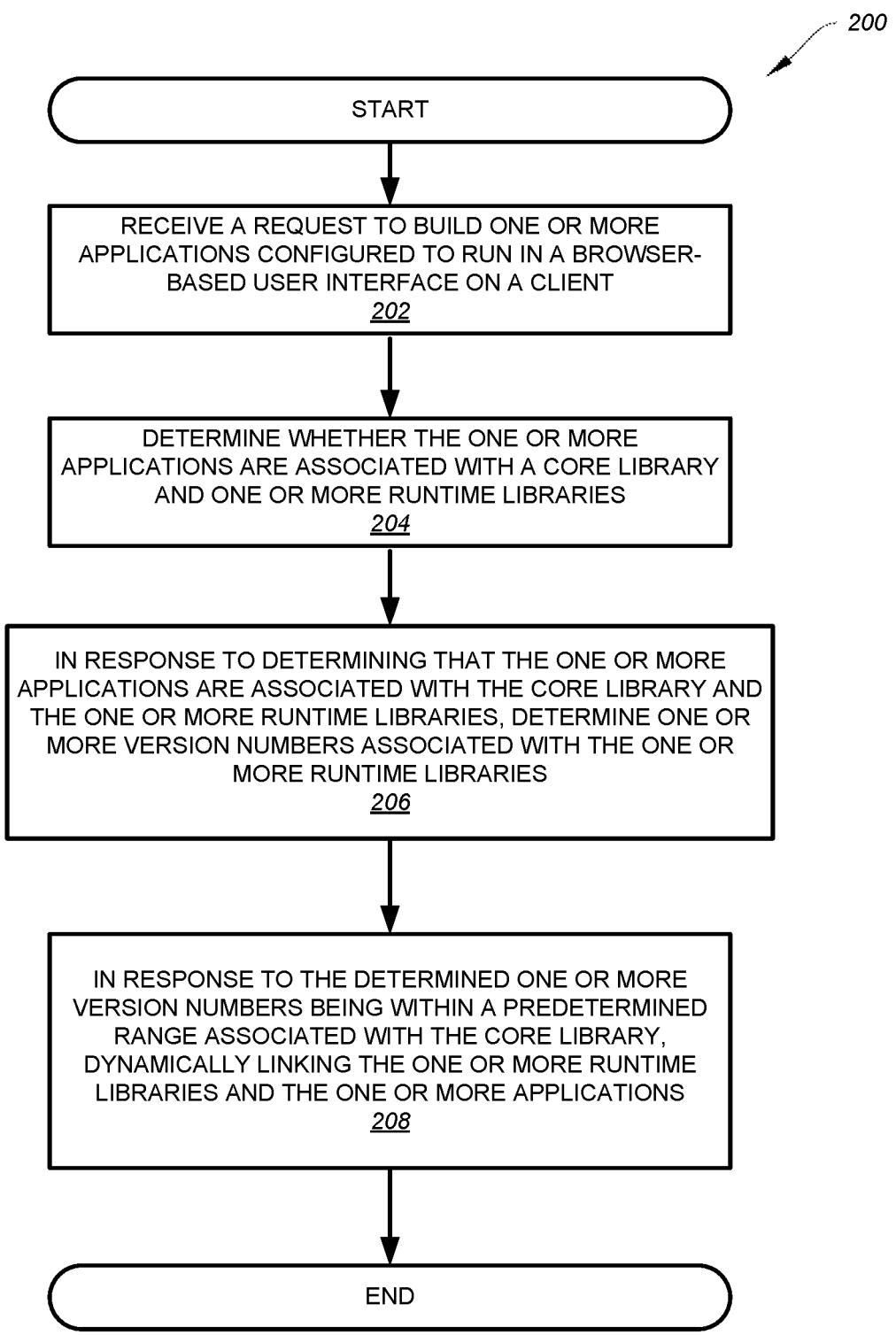
FIG. 2 is a flowchart illustrating one example of a method for developing an application associated with a browser-based user interface in accordance with the disclosure.

FIG. 2 is a flowchart illustrating one example of a method 200 for developing one or more applications 108 associated with (e.g., provided by) a browser-based user interface 112 within a multi-developer computing platform 103 that is performed using one or more processors of the system of FIG. 1. This diagram is merely an example, which should not unduly limit the scope of the claims. One of ordinary skill in the art would recognize many variations, alternatives, and modifications. As shown in block 202 the method includes receiving a request to build one or more applications configured to run in a browser-based user interface on a client. As shown in block 204 the method includes determining whether the one or more applications are associated with a core library and one or more runtime libraries. As shown in block 206, in response to determining that the one or more applications are associated with the core library and the one or more runtime libraries the method includes determining one or more version numbers associated with the one or more runtime libraries. As shown in block 208, in response to the determined one or more version numbers being within a predetermined range associated with the core library, the method includes dynamically linking the one or more runtime libraries and the one or more applications. In some examples, the system produces metadata for runtime versions as part of a final application bundle. The system processes the metadata about the runtime version and determines which version of an application to provide to the browser-based UI as part of a runtime compliance operation.

In certain embodiments, in response to the determined one or more version numbers being outside the predetermined range associated with the core library, the system statically links the one or more runtime libraries and the one or more applications. In some embodiments, in response to the determined one or more version numbers being within the predetermined range associated with the core library, the system guarantees that the dynamically linked one or more runtime libraries are accessible at runtime by the one or more applications through the browser-based user interface. In some embodiments, the core library includes an API layer for implementing and integrating common features across the multi-developer computing platform. In certain embodiments, the core library includes one or more common functions associated with an application of the one or more applications. For example, the core library allows at least one of the applications of the plurality of applications to interact with workspace runtime application interfaces (APIs) by importing the workspace runtime APIs from a versioned package as if they were another front-end library. In some embodiments, the browser-based user interface is configured to run the one or more applications in a single-threaded mode.

In some embodiments, some or all processes (e.g., steps) of the method 200 are performed by the system 100. In certain examples, some or all processes (e.g., steps) of the method 200 are performed by a computer and/or a processor directed by a code. For example, a computer includes a server computer and/or a client computer (e.g., a personal computer). In some examples, some or all processes (e.g., steps) of the method 200 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

Figure 3:
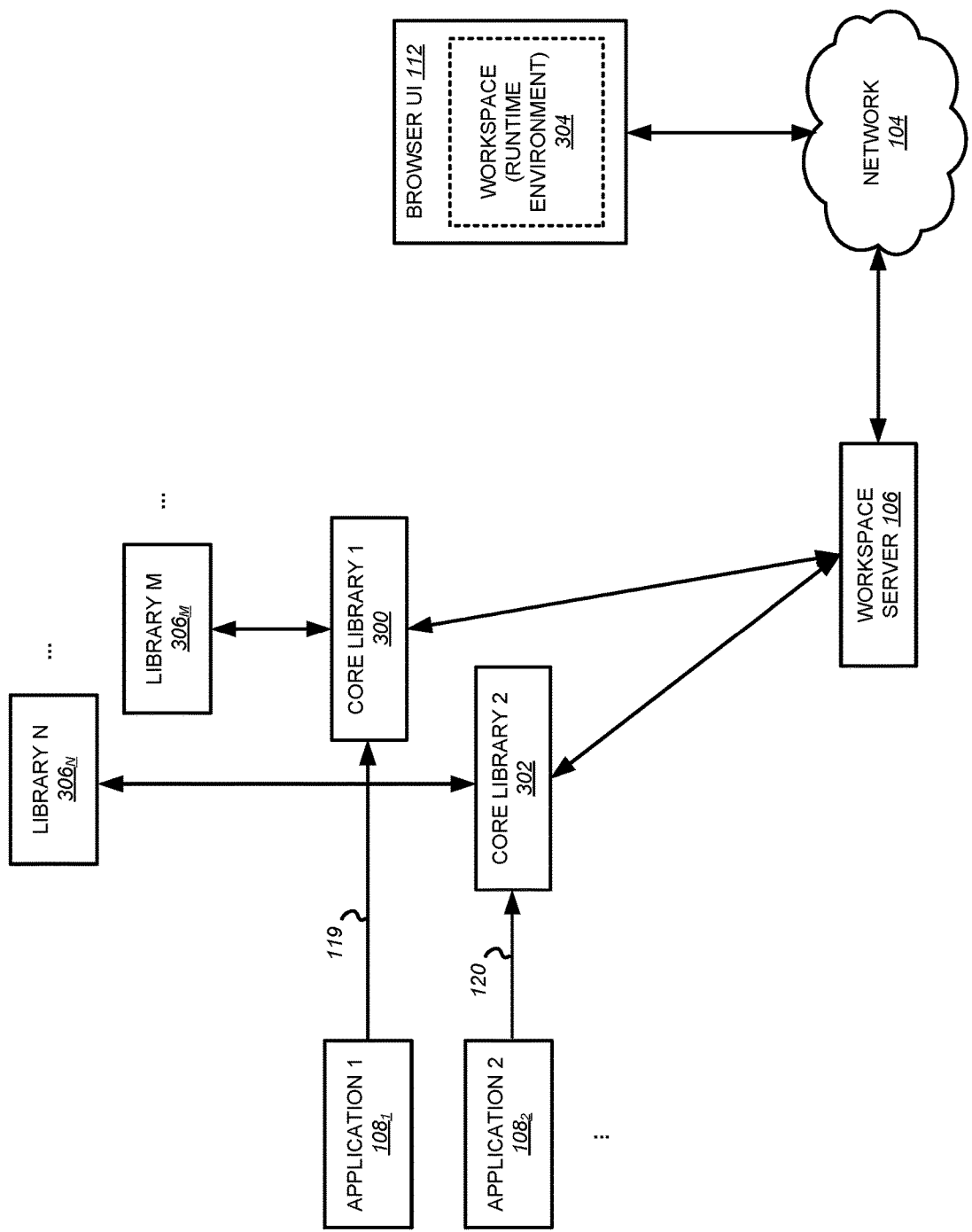
FIG. 3 is an example of a system for running an application associated with a browser-based user interface in accordance with one example set forth in the disclosure.

FIG. 3 illustrates an example of the system 100 that upgrades applications associated with a browser-based user interface within a multi-developer computing platform. This diagram is merely an example, which should not unduly limit the scope of the claims. One of ordinary skill in the art would recognize many variations, alternatives, and modifications. The client device 102 presents the browser-based user interface 304. The browser-based user interface 304 provides a first core library 300 and a second core library 302, each of the first core library 300 and the second core library 302 being associated with different versions of one or more runtime libraries 306n and 306m. The browser-based user interface 304 provides applications 108 with access to the different versions of the one or more runtime libraries 306n and 306m through the browser-based user interface 304 and determines the versions of the one or more runtime libraries being accessed through a log file generated by the first core library 300 and the second core library 302. In response to determining that no versions of the one or more runtime libraries 306m of the first core library 300 is being accessed for a predetermined time period, the system terminates the first core library 300. In one example, a timeout threshold is stored against which a time period is compared and when the threshold is exceeded, the core library is terminated.

In some examples the first core library 300 and the second core library 302 are each an NPM package. In certain examples, in response to determining that no versions of the one or more runtime libraries of the first core library 300 is being accessed for a predetermined time period, the system 100 provides a third core library, each of the first core library, the second core library and the third core library being associated with different versions of the one or more runtime libraries. In certain examples, the browser-based user interface is further configured to run the applications in a single-threaded mode.

Figure 4A:
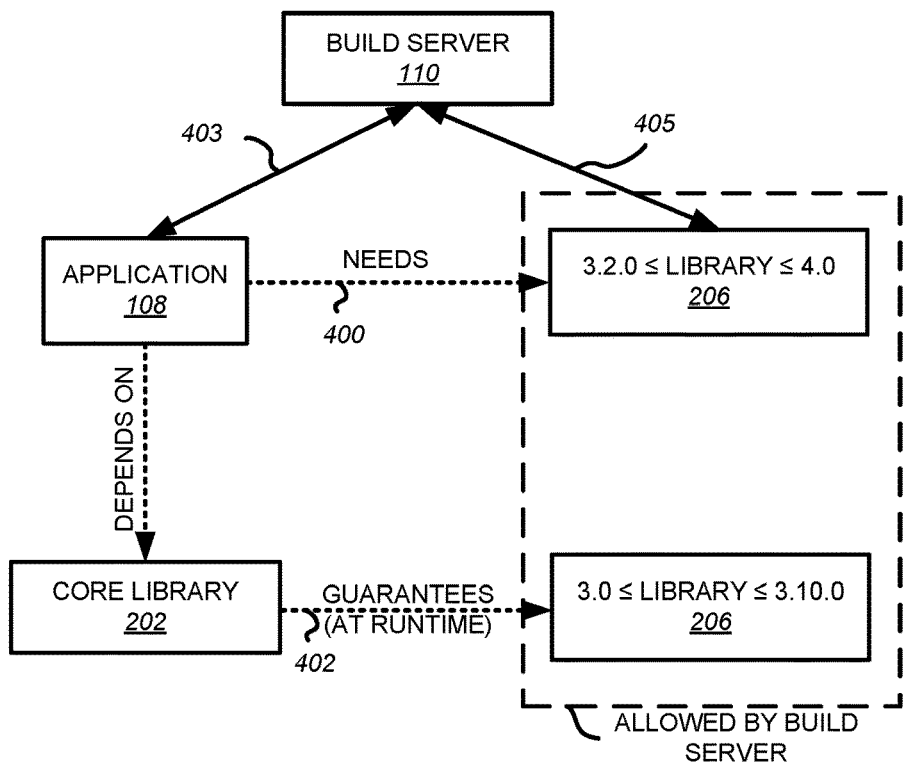
FIG. 4A is a diagram illustrating one example of a build server operation in accordance with one example set forth in the disclosure.
Figure 4B:
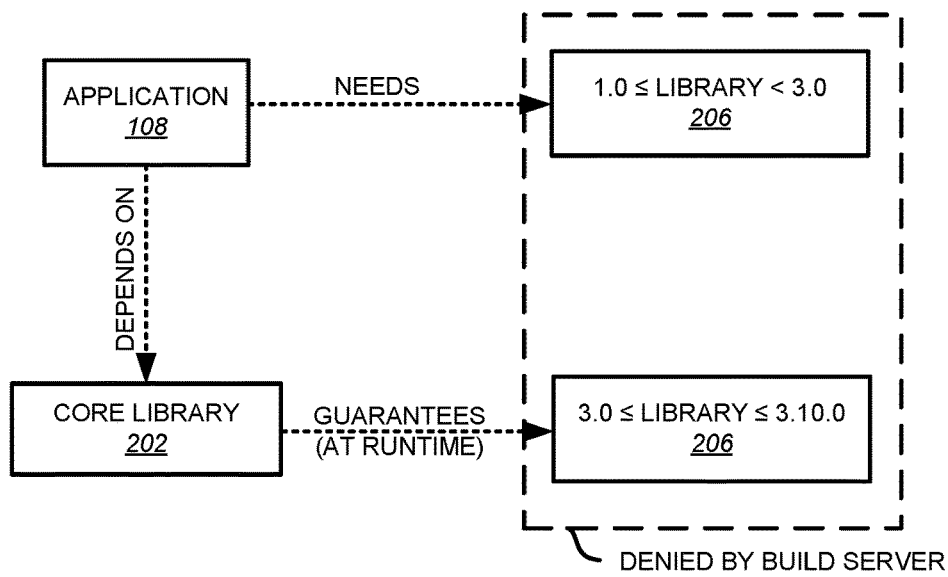
FIG. 4B is a diagram illustrating one example of a build server operation in accordance with one example set forth in the disclosure.
Figure 4C:
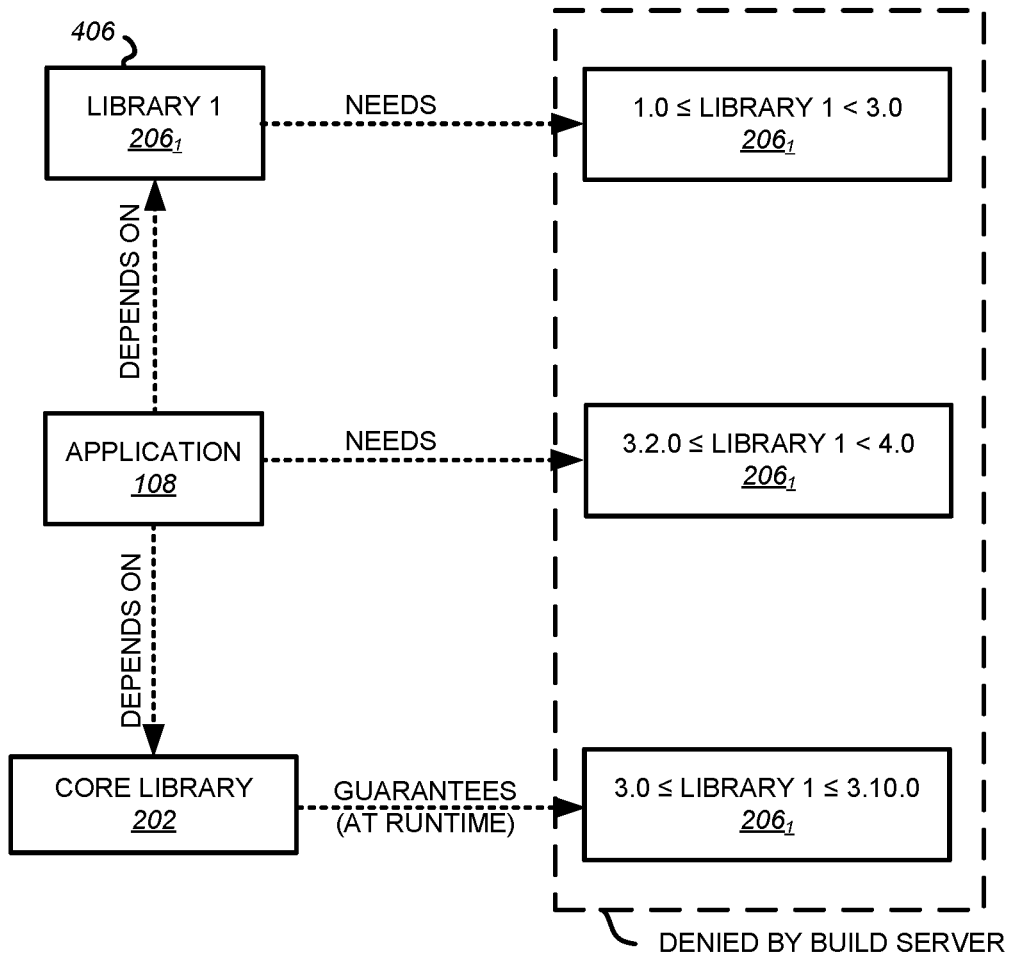
FIG. 4C is a diagram illustrating one example of a build server operation in accordance with one example set forth in the disclosure.

FIGS. 4A-4C diagrammatically illustrate build server 110 operation when using the core library. These diagrams are merely examples, which should not unduly limit the scope of the claims. One of ordinary skill in the art would recognize many variations, alternatives, and modifications. In FIG. 4A, the build server 110 determines that the application 108 needs, as illustrated by arrow 400, or depends on a particular runtime library 206 with a version range from 3.20 to 4.0. The build server determines whether the runtime libraries that the application needs, represented by arrow

403, are in a current version of the core library that guarantees access to certain runtime libraries. The runtime library version range comparison is shown by arrow 405. In this example, the core library 202 includes the runtime library versions 3.0 to 3.10 which it will guarantee at runtime as indicated by arrow 402. The build server 110 obtains the core library version data from a log or other source. In this example, the version data is the specific version range of runtime libraries that the core library 114 will guarantee as required by the application 108. If an overlap occurs, then the build server allows the build of the application to occur. During runtime, the application depends from the core library and the core library guarantees runtime library version range 3.0 to 3.10 and provides the appropriate library at runtime. As such, the core library 114, through the workspace server 106, provides a runtime environment with the appropriate versioned runtime libraries using the core library 202 as opposed to the application 108 directly accessing the library.

FIG. 4B illustrates a condition where the build server denies the build. In this example, the application 108 requires the runtime library to be between versions 1.0 and <3.0. The core library 202 however only provides access to the library having a version range of 3.0 to 3.10. Because the application needs a library version of less than 3.0, there is no overlap between what the core library guarantees and the dependency that the application needs. Accordingly, the build server 110 when comparing the library versions, determines that no overlaps exists and denies the build.

FIG. 4C illustrates another example of the build server 110 denying the build of the application. In this example, the application 108 depends on a library 406 considered as a transitive dependency and also depends on the core library 202. The application 108 itself needs a version of the library that is version 3.2 to <4.0 and the core library will guarantee at runtime access to the library within this range (core library guarantees at runtime a library that is between version 3.0 and 3.10) which is in the range needed by the application. However, because the application also depends on the transitive dependency of library version 406 which is version number 1.0 to <3, the build server 110 denies the build because the transitive library version range will not be provided at runtime by the core library when the transitive dependency is externalized. Stated another way, the range of transitive library version is outside the range of the runtime library versions provided by the core library.

In some embodiments, some or all processes (e.g., steps) of the method of FIGS. 4A-C are performed by the system 100. In certain examples, some or all processes (e.g., steps) of the method are performed by a computer and/or a processor directed by a code. For example, a computer includes a server computer and/or a client computer (e.g., a personal computer). In some examples, some or all processes (e.g., steps) of the method are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

Figure 5A:
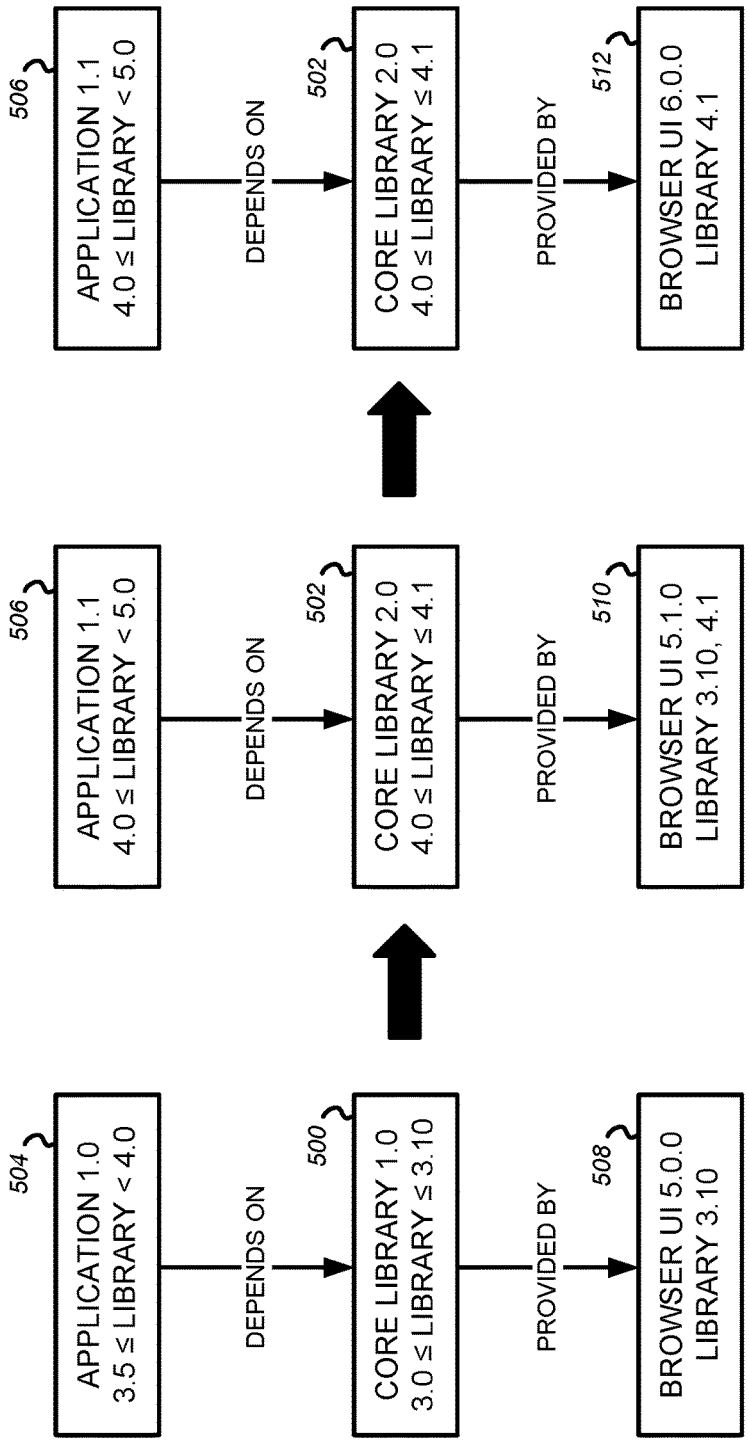
FIG. 5A is a diagram illustrating an upgrade process of a core library in accordance with one example set forth in the disclosure.
Figure 5B:
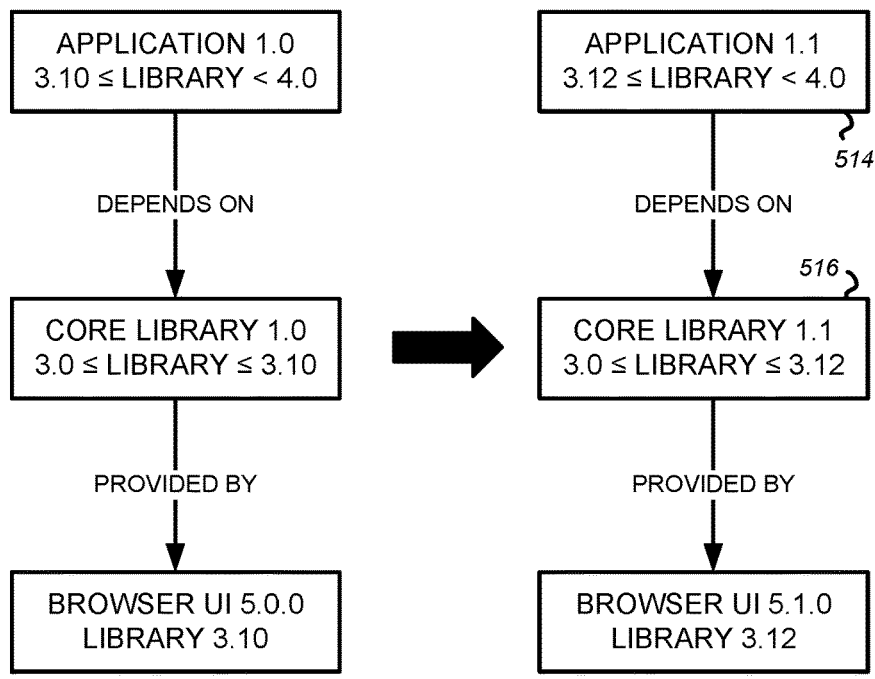
FIG. 5B is a diagram illustrating an upgrade process of a core library in accordance with one example set forth in the disclosure.
Figure 5C:
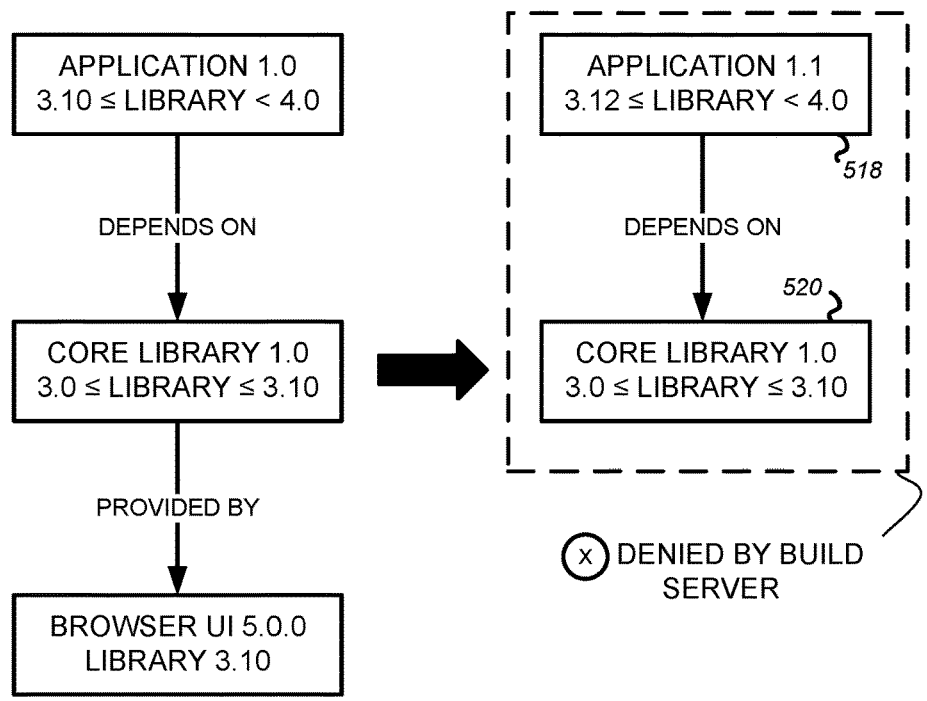
FIG. 5C is a diagram illustrating an upgrade process of a core library in accordance with one example set forth in the disclosure.

FIGS. 5A-5C diagrammatically illustrate examples of upgrading the core library by the computing platform. These diagrams are merely examples, which should not unduly limit the scope of the claims. One of ordinary skill in the art would recognize many variations, alternatives, and modifications. FIG. 5A illustrates the allowance of a major upgrade of the core library. As shown, the core library version 1.0 shown by block 500 provides access to a runtime library version range 3.0 to 3.10. the browser-based user interface as shown by block 508 provides runtime library version 3.10 from the core library version 1.0. A major upgrade of the core library from version 1.0 to 2.0, shown in block 502, is allowed. The core library version 2.0 as shown provides access to runtime libraries in a version range from 4.0 to 4.1. The application has also undergone a minor upgrade from version 1.0 to 1.1 as illustrated by blocks 504 and 506. The workspace server accommodates (supports) multiple versions of the core library at the same time. As such, a new major version of the core library can be introduced with a minor version of the browser-based UI as illustrated by blocks 508 and 510 by supporting two major versions of the core library in a minor version upgrade of the browser user interface, a problem is avoided of having either the application or browser-based user interface being undeployable when the application upgrades to a new major version of the library. For example, the browser UI in block 508 is allowed to undergo a minor upgrade to version 5.1 as shown in block 510 and supports multiple versions of runtime libraries 3.10 and 4.1 from the core library during runtime. Multiple core libraries 500 and 502 can be employed or core library 1.0 can be upgraded to core library 2.0 because the application as shown in blocks 504 and 506 which also undergoes a minor upgrade have also changed their version of the runtime libraries that they depend on. The computing platform also provides a major upgrade to the browser UI as shown in block 512 where the core library and the application version and run library versions have remained the same.

In some examples, the build server 110 or other component detects that all assets are managed by the new major version of the core library, version 2.0 in this example, and drops support for core library version 1.0 so that the version can be safely released. The assets will continue to work in the new runtime environment in addition to ensuring that the browser-based UI 6.00 will be deployed with minimal blockers.

With respect to FIG. 5B, a minor upgrade of the core library is allowed. The core library guarantees that versions within a certain range will be provided at runtime. As shown, a new minor version of the core library is released that provides runtime libraries in a version range from 3.0 to 3.12 from a previous version range of 3.0 to 3.10. This is because the application 1.1 as shown in block 514 depends on a library version range of 3.12 to <4.0 and the core library shown in block 516 provides an overlapping library version, namely version 3.12. Accordingly, the build server will allow the upgrade of the core library with the minor version of the core library.

FIG. 5C illustrates an example of the denial of an upgrade of a core library by the build server. In this example, the application shown in block 518 depends on a runtime library version between 3.12 and <4.0. However, the core library as shown in block 520 will only guarantee a runtime library version up to 3.10, which is less than 3.12. As such, the build sever denies the upgrade of the core library and will raise an error at build time.

In some embodiments, some or all processes (e.g., steps) of the method shown in FIGS. 5A-C are performed by the system 100. In certain examples, some or all processes (e.g., steps) of the method are performed by a computer and/or a processor directed by a code. For example, a computer includes a server computer and/or a client computer (e.g., a personal computer). In some examples, some or all processes (e.g., steps) of the method are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

Figure 6:
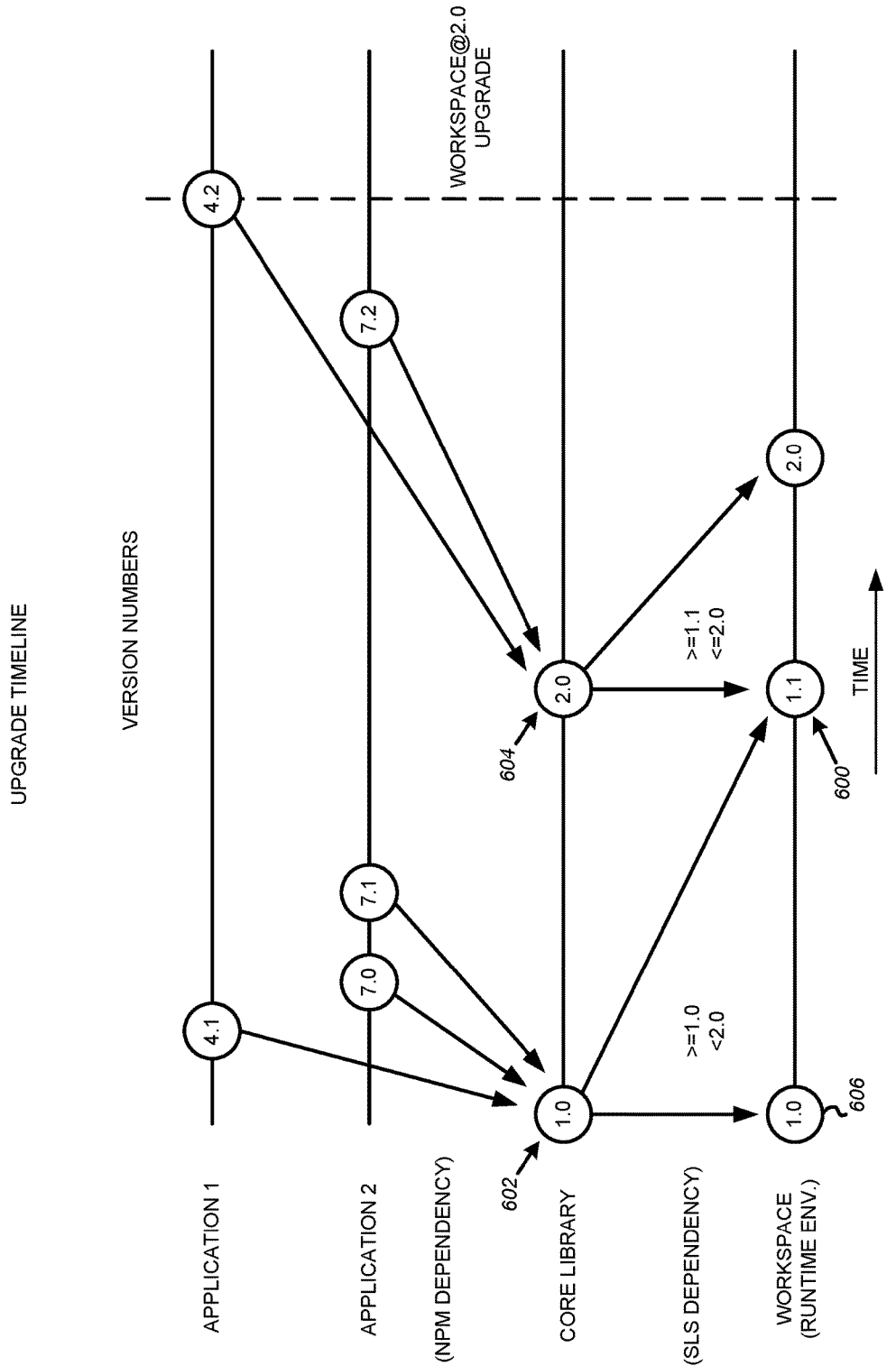
FIG. 6 diagrammatically illustrates an upgrade timeline for upgrading a workspace with core library updates in accordance with one example set forth in the disclosure.

FIG. 6 illustrates a diagram showing a process for upgrading a core library and browser-based UI (workspace runtime environment) in accordance with one example set forth in the disclosure. This diagram is merely an example, which should not unduly limit the scope of the claims. One of ordinary skill in the art would recognize many variations, alternatives, and modifications. A given browser-based user interface version may support multiple versions of the core library. As shown by browser-based user interface version 1.1 600, the workspace environment version supports two core library versions 602 and 604. As illustrated, application 1, version 4.1 depends on core library 602 as does another application both versions 7.0 and 7.1. The browser-based user interface 606 provides the core library 602 for the application 1 and application 2. The core library to browser user interface may be represented as an SLS dependency whereas the dependency between applications and the core library may be reflected as an NPM dependency. When a workspace or browser-based user interface upgrade occurs, in this example a minor version from version 1.0 606 to 1.1 600, the same browser-based user interface can support multiple versions of application 2 (7.0 and 7.1) and version 4.1 of the application through core library 602 and also by supporting multiple core libraries can support other versions of application 1 and 2 (4.1 and 7.2 respectively). As such, the release of the core library occurs in a smooth manner on an existing supported browser-based user interface version for applications. This operation is performed, in one example, by the build server to coordinate core library upgrades.

In some embodiments, some or all processes (e.g., steps) of the method depicted in FIG. 6 are performed by the system 100. In certain examples, some or all processes (e.g., steps) of the method are performed by a computer and/or a processor directed by a code. For example, a computer includes a server computer and/or a client computer (e.g., a personal computer). In some examples, some or all processes (e.g., steps) of the method are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

Figure 7:
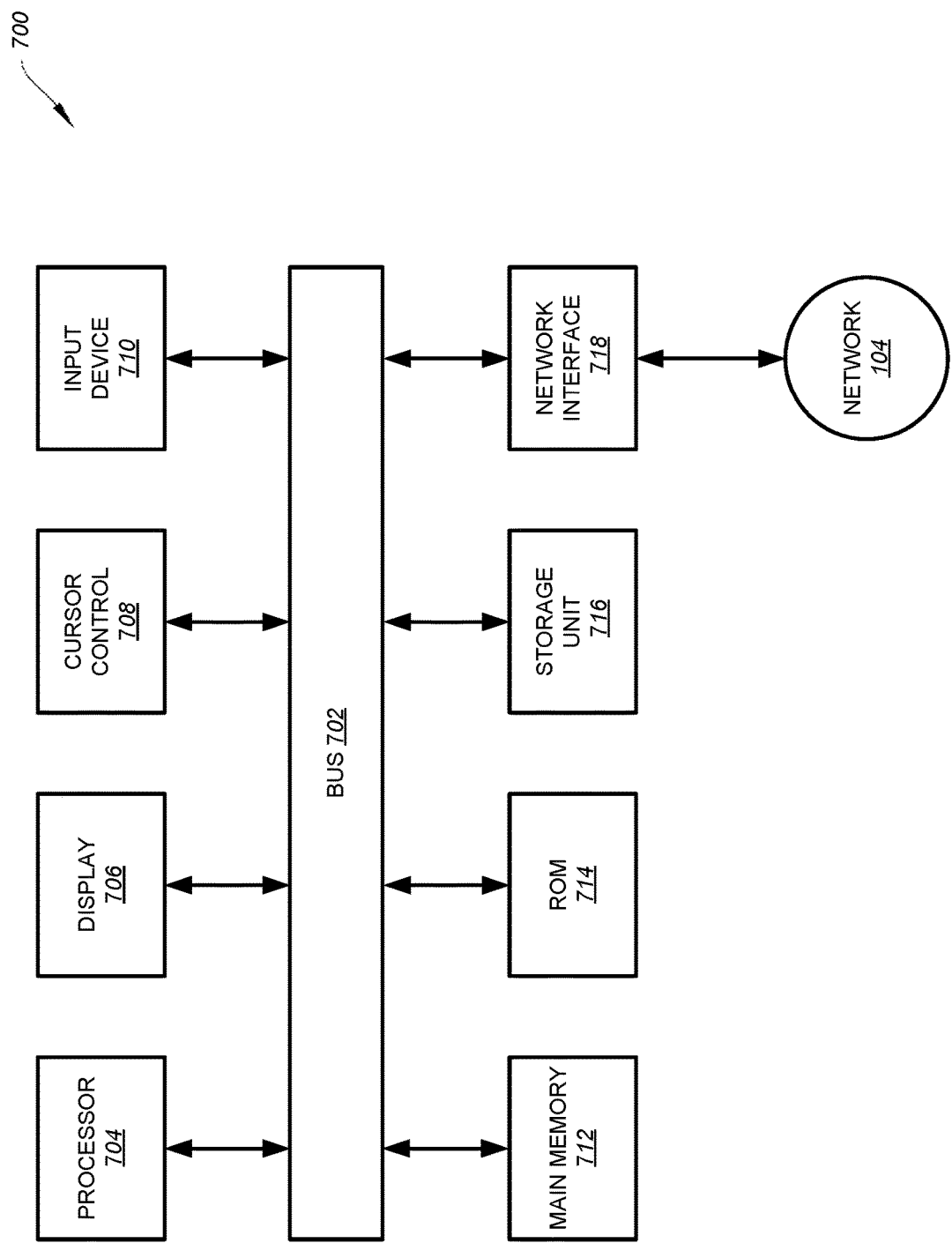
FIG. 7 is a simplified diagram showing a computing system for implementing a system for a system for running an application associated with a browser-based user interface in accordance with one example set forth in the disclosure in accordance with one example set forth in the disclosure.

FIG. 7 is a simplified diagram showing a computing system for developing and running an application associated with a browser-based user interface within a multi-developer computing platform according to some embodiments of the present disclosure. This diagram is merely an example, which should not unduly limit the scope of the claims. One of ordinary skill in the art would recognize many variations, alternatives, and modifications. The computing system 700 may be distributed across multiple devices or in one device and includes a bus 702 or other communication mechanism for communicating information, a processor 704 (e.g., one or more processing cores), a display 706, a cursor control component 708, an input device 710, a main memory 712, a read only memory (ROM) 714, a storage unit 716, and a network interface 718. In some embodiments, some or all processes (e.g., steps) of the methods illustrated by FIGS. 2, 4, 5 and 6 are performed by the computing system 700. In some examples, the bus 702 is coupled to the processor 704, the display 706, the cursor control component 707, the input device 710, the main memory 712, the read only memory (ROM) 714, the storage unit 716, and/or the network interface 718. In certain examples, the network interface is coupled to a network 104 or other components, processes, systems or subsystems of the system 100. For example, the processor 704 includes one or more general purpose microprocessors. In some examples, the main memory 712 (e.g., random access memory (RAM), cache and/or other dynamic storage devices) is configured to store information and instructions to be executed by the processor 704. In certain examples, the main memory 712 is configured to store temporary variables or other intermediate information during execution of instructions to be executed by processor 704. For examples, the instructions, when stored in the storage unit 716 accessible to processor 704, render the computing system 700 into a special-purpose machine that is customized to perform the operations specified in the instructions. In some examples, the ROM 714 is configured to store static information and instructions for the processor 704. In certain examples, the storage unit 716 (e.g., a magnetic disk, optical disk, or flash drive) is configured to store information and instructions. In some embodiments the client device employs the structure shown in FIG. 7.

In some embodiments, the display 706 (e.g., a cathode ray tube (CRT), an LCD display, or a touch screen) is configured to display information to a user of the computing system 700. In some examples, the input device 710 (e.g., alphanumeric and other keys) is configured to communicate information and commands to the processor 704. For example, the cursor control 708 (e.g., a mouse, a trackball, or cursor direction keys) is configured to communicate additional information and commands (e.g., to control cursor movements on the display 706) to the processor 704.

According to some embodiments, a method for running an application associated with a browser-based user interface within a multi-developer computing platform includes receiving a request to run an application in the browser-based user interface, the application being associated with a core library, such as an application programming interface (API). In certain implementations the method includes determining whether the application is associated with one or more runtime libraries. In response to determining that the application is associated with the one or more runtime libraries, the method includes determining one or more version numbers associated with the one or more runtime libraries and in response to the determined one or more version numbers being within a predetermined range associated with the core library, the method provide access to the one or more runtime libraries through the browser-based user interface. The method is performed using one or more processors. For example, the method is implemented according to at least FIG. 1, FIG. 2, FIG. 4, FIG. 5, FIG. 6 and/or FIG. 7.

In certain examples, the browser-based user interface (e.g., the runtime environment) is further configured to log version numbers of the accessed one or more runtime libraries in a data store in response to the determined one or more version numbers being within the predetermined range associated with the core library. In some implementations, logging of the version numbers is used to track which versions are no longer being used or are being used so infrequently that the library versions can be removed as potential runtime libraries.

In some examples the browser-based user interface (e.g., the runtime environment) is further configured to, send information to the application corresponding to the one or more runtime libraries not being accessible through the browser-based user interface, in response to the determined one or more version numbers being outside the predetermined range associated with the core library.

In certain examples the core library includes one or more common functions and the browser-based user interface is further configured to determine whether the application is associated with the one or more common functions. In some implementations the browser-based user interface is further configured to, in response to determining that the application is associated with the one or more common functions, determine a version number associated with the one or more common functions associated with the application and provide access to a version of the one or more common functions corresponding the determined version number through the browser-based user interface.

In some examples, the browser-based user interface is further configured to log the determined version number associated with the one or more common functions in a data store. According to certain embodiments, the core library is comprised of an NPM package. According to some embodiments, the core library includes an API layer for implementing and integrating common functions across a multi-developer computing platform. According to some embodiments, the browser-based user interface is further configured to run one or more applications in a single-threaded mode.

According to certain embodiments, a system for running an application associated with a browser-based user interface within a multi-developer computing platform includes one or more clients including a browser-based user interface. The browser-based user interface is configured to: receive a request to run an application in the browser-based user interface, the application being associated with a core library. The system is configured to determine whether the application is associated with one or more runtime libraries, and in response to determining that the application is associated with the one or more runtime libraries, determine one or more version numbers associated with the one or more runtime libraries. In response to the determined one or more version numbers being within a predetermined range associated with the core library, the system provides access to the one or more runtime libraries. For example, the system is implemented according to at least FIG. 1, FIG. 2, FIG. 4, FIG. 5, FIG. 6, and/or FIG. 7.

In some examples, one or more processors are configured to: in response to the determined one or more version numbers being within the predetermined range associated with the core library, log version numbers of the accessed one or more runtime libraries in a data store. In certain examples, the browser-based user interface is further configured to: in response to the determined one or more version numbers being outside the predetermined range associated with the core library, send information to the application corresponding to the one or more runtime libraries not being accessible through the browser-based user interface.

In certain examples, the core library includes one or more common functions; and the browser-based user interface is further configured to determine whether the application is associated with the one or more common functions. In other examples, the browser-based user interface is further configured to, in response to determining that the application is associated with the one or more common functions: determine a version number associated with the one or more common functions associated with the application; and provide access to a version of the one or more common functions corresponding the determined version number through the browser-based user interface. In some examples, the browser-based user interface is further configured to log the determined version number associated with the one or more common functions in a data store.

In certain examples, the core library is comprised of an NPM package and in some examples the core library includes an API layer for implementing and integrating common functions across a multi-developer computing platform. In certain examples, the browser-based user interface is further configured to run one or more applications in a single-threaded mode.

According to some embodiments, a system for running an application associated with a browser-based user interface within a multi-developer computing platform includes one or more processors and memory comprising computer executable instructions that when executed by the one or more processors causes the one or more processors to: store a plurality of applications that are to be provided in a browser-based user interface, the plurality of applications being associated with a core library and provide bowser-based user interface code, and also determines whether an application selected for use in the browser-based user interface is associated with one or more runtime libraries, and in response to determining that the application is associated with the one or more runtime libraries: determine one or more version numbers associated with the one or more runtime libraries; and in response to the determined one or more version numbers being within a predetermined range associated with the core library, provide access to the one or more runtime libraries through the browser-based user interface. For example, the system is implemented according to at least FIG. 1, FIG. 2, FIG. 4, FIG. 5, FIG. 6, and/or FIG. 7.

In certain examples, the core library includes one or more common functions; and the memory contains computer executable instructions that when executed by the one or more processors causes the one or more processors to determine whether the application is associated with the one or more common functions. For example, the core library allows at least one of the applications of the plurality of applications to interact with workspace runtime application interfaces (APIs) by importing the workspace runtime APIs from a versioned package as if they were another front-end library In other embodiments, a method for developing one or more applications associated with a browser-based user interface within a multi-developer computing platform is disclosed. The method includes: receiving a request to build one or more applications configured to run in a browser-based user interface on a client; determining whether the one or more applications are associated with a core library and one or more runtime libraries; and in response to determining that the one or more applications are associated with the core library and the one or more runtime libraries: determining one or more version numbers associated with the one or more runtime libraries; and in response to the determined one or more version numbers being within a predetermined range associated with the core library, dynamically linking the one or more runtime libraries and the one or more applications. The method is performed using one or more processors. For example, the method is implemented according to at least FIG. 1, FIG. 2, FIG. 4, FIG. 5, FIG. 6, and/or FIG. 7.

In some examples, the method includes: in response to the determined one or more version numbers being outside the predetermined range associated with the core library, statically linking the one or more runtime libraries and the one or more applications.

In certain examples, the method further includes: in response to the determined one or more version numbers being within the predetermined range associated with the core library, guaranteeing that the dynamically linked one or more runtime libraries are accessible at runtime by the one or more applications through the browser-based user interface.

In some examples, the core library is comprised of a node package manager (NPM) package. In certain examples, the core library includes an API layer for implementing and integrating common functions across a multi-developer computing platform. In other examples, the core library includes one or more common functions associated with an application of the one or more applications. For example, the core library allows at least one of the applications of the plurality of applications to interact with workspace runtime application interfaces (APIs) by importing the workspace runtime APIs from a versioned package as if they were another front-end library. In certain examples, the browser-based user interface is configured to run the one or more applications in a single-threaded mode.

In certain embodiments, a system for developing one or more applications associated with a browser-based user interface within a multi-developer computing platform includes one or more processors configured to receive a request to build one or more applications configured to run in a browser-based user interface on a client. The one or more processors determines whether the one or more applications are associated with a core library and one or more runtime libraries, and in response to determining that the one or more applications are associated with the core library and the one or more runtime libraries, determines one or more version numbers associated with the one or more runtime libraries. In response to the determined one or more version numbers being within a predetermined range associated with the core library, the one or more processors dynamically links the one or more runtime libraries and the one or more applications.

In some examples, the one or more processors are configured to, in response to the determined one or more version numbers being outside the predetermined range associated with the core library, statically link the one or more runtime libraries and the one or more applications. In certain examples, the one or more processors are configured to, in response to the determined one or more version numbers being within the predetermined range associated with the core library, guarantee that the dynamically linked one or more runtime libraries are accessible at runtime by the one or more applications through the browser-based user interface.

In some examples, the core library is a NPM package. In certain examples, the core library includes an API layer for implementing and integrating common features across a multi-developer computing platform. In some examples, the core library includes one or more common functions associated with an application of the one or more applications. For example, the core library allows at least one of the applications of the plurality of applications to interact with workspace runtime application interfaces (APIs) by importing the workspace runtime APIs from a versioned package as if they were another front-end library. In certain examples, the browser-based user interface is configured to run the one or more applications in a single-threaded mode.

In certain embodiments, a system for upgrading applications associated with a browser-based user interface within a multi-developer computing platform includes: one or more clients including a browser-based user interface. One or more processors is configured to: provide a first core library and a second core library, each of the first core library and the second core library being associated with different versions of one or more runtime libraries and configured to provide applications with access to the different versions of the one or more runtime libraries through the browser-based user interface; determine the versions of the one or more runtime libraries being accessed through a log file generated by the first core library and the second core library; and in response to determining that no versions of the one or more runtime libraries of the first core library is being accessed for a predetermined time period, terminate the first core library.

In some examples the first core library and the second core library are each comprised of an NPM package. In certain examples, in response to determining that no versions of the one or more runtime libraries of the first core library is being accessed for a predetermined time period, the system provides a third core library, each of the first core library, the second core library and the third core library being associated with different versions of the one or more runtime libraries.

In certain examples, the browser-based user interface is further configured to run the applications in a single-threaded mode.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for developing one or more applications associated with a browser-based user interface within a multi-developer computing platform, the method comprising:
   receiving a request to build one or more applications configured to run in a browser-based user interface on a client;
   determining whether the one or more applications are associated with a core library and one or more runtime libraries; and
   in response to determining that the one or more applications are associated with the core library and the one or more runtime libraries:
      determining one or more version numbers associated with the one or more runtime libraries; and
      in response to the determined one or more version numbers being within a predetermined range associated with the core library, dynamically linking the one or more runtime libraries and the one or more applications;
   wherein the method is performed using one or more processors; and
   wherein the core library allows at least one of the one or more applications to interact with one or more workspace runtime application interfaces (APIs) by importing the one or more workspace runtime APIs.

2. The method of claim 1, and further comprising:
   in response to the determined one or more version numbers being outside the predetermined range associated with the core library, statically linking the one or more runtime libraries and the one or more applications.

3. The method of claim 1, and further comprising:
   in response to the determined one or more version numbers being within the predetermined range associated with the core library, guaranteeing that the dynamically linked one or more runtime libraries are accessible at runtime by the one or more applications through the browser-based user interface.

4. The method of claim 1 wherein the core library is a node package manager (NPM) package.

5. The method of claim 1 wherein the core library includes an API layer for implementing and integrating common features across a multi-developer computing platform.

6. The method of claim 1 wherein the one or more workspace runtime APIs are imported from a versioned package.

7. The method of claim 1 wherein the browser-based user interface is configured to run the one or more applications in a single-threaded mode.

8. A system for developing one or more applications associated with a browser-based user interface within a multi-developer computing platform, the system comprising:
   one or more processors configured to:
      receive a request to build one or more applications configured to run in a browser-based user interface on a client;
      determine whether the one or more applications are associated with a core library and one or more runtime libraries; and
      in response to determining that the one or more applications are associated with the core library and the one or more runtime libraries:
         determine one or more version numbers associated with the one or more runtime libraries; and
         in response to the determined one or more version numbers being within a predetermined range associated with the core library, dynamically link the one or more runtime libraries and the one or more applications;
   wherein the core library allows at least one of the one or more applications to interact with one or more workspace runtime application interfaces (APIs) by importing the one or more workspace runtime APIs.

9. The system of claim 8, wherein the one or more processors are configured to:

in response to the determined one or more version numbers being outside the predetermined range associated with the core library, statically link the one or more runtime libraries and the one or more applications.

10. The system of claim 8 wherein the one or more processors are configured to:
in response to the determined one or more version numbers being within the predetermined range associated with the core library, guarantee that the dynamically linked one or more runtime libraries are accessible at runtime by the one or more applications through the browser-based user interface.

11. The system of claim 8 wherein the core library is a node package manager (NPM) package.

12. The system of claim 8 wherein the core library includes an API layer for implementing and integrating common features across a multi-developer computing platform.

13. The system of claim 8 wherein the one or more workspace runtime APIs are imported from a versioned package.

14. The system of claim 8 wherein the browser-based user interface is configured to run the one or more applications in a single-threaded mode.

15. A system for upgrading applications associated with a browser-based user interface within a multi-developer computing platform, the system comprising:
one or more clients including a browser-based user interface;
one or more processors of a computing platform configured to:
interface with a first core library and a second core library, each of the first core library and the second core library being associated with different versions of one or more runtime libraries and configured to provide one or more applications with access to the different versions of the one or more runtime libraries through the browser-based user interface;
determine the versions of the one or more runtime libraries being accessed through a log file generated by the first core library and the second core library; and
in response to determining that no versions of the one or more runtime libraries of the first core library is being accessed for a predetermined time period, terminate the first core library by freeing up one or more computing resources the first core library was using prior to being terminated;
wherein the first core library and the second core library each allow at least one application of the one or more applications to interact with one or more workspace runtime application interfaces (APIs) by importing the one or more workspace runtime APIs.

16. The system of claim 15 wherein the first core library and the second core library are node package manager (NPM) packages.

17. The system of claim 15, and further comprising:
in response to determining that no versions of the one or more runtime libraries of the first core library is being accessed for the predetermined time period, provide a third core library, each of the first core library, the second core library and the third core library being associated with different versions of the one or more runtime libraries.

18. The system of claim 15 wherein the browser-based user interface is further configured to run the one or more applications in a single-threaded mode.

19. The system of claim 15 wherein the first core library and the second core library each include a respective API layer for implementing and integrating common features across a multi-developer computing platform.

20. The system of claim 15 wherein the one or more workspace runtime APIs are imported from a versioned package.

* * * * *